United States Patent
Hoefken

(10) Patent No.: US 8,944,421 B2
(45) Date of Patent: Feb. 3, 2015

(54) DEVICE FOR AERATING A SUSPENSION HELD IN A TREATMENT TANK

(75) Inventor: Marcus Hoefken, Erlangen (DE)

(73) Assignee: Invent Umwelt-und Verfahrenstechnik AG, Erlangen (DE)

( * ) Notice: Subject to any disclaimer, the term of this patent is extended or adjusted under 35 U.S.C. 154(b) by 136 days.

(21) Appl. No.: 13/582,590

(22) PCT Filed: Mar. 8, 2011

(86) PCT No.: PCT/EP2011/053467
§ 371 (c)(1),
(2), (4) Date: Sep. 27, 2012

(87) PCT Pub. No.: WO2011/113726
PCT Pub. Date: Sep. 22, 2011

(65) Prior Publication Data
US 2013/0020728 A1 Jan. 24, 2013

(30) Foreign Application Priority Data
Mar. 17, 2010 (DE) .......................... 10 2010 002 959

(51) Int. Cl.
*C02F 3/20* (2006.01)

(52) U.S. Cl.
CPC .. *C02F 3/201* (2013.01); *C02F 3/20* (2013.01)
USPC ...................................... 261/124; 210/221.2

(58) Field of Classification Search
CPC ............ B01F 3/04262; B01F 3/04113; B01F 2003/04184; B01F 2003/04177; B01F 2003/0429; C02F 3/203
USPC ................ 261/124; 210/221.2, 220, 620–626
See application file for complete search history.

(56) References Cited

U.S. PATENT DOCUMENTS

| 1,391,992 | A | * | 9/1921 | Brasher | 405/22 |
| 2,637,541 | A | * | 5/1953 | Rubin | 261/122.1 |
| 2,917,295 | A | * | 12/1959 | Hauer | 261/124 |
| 3,043,296 | A | * | 7/1962 | Gregory | 601/168 |

(Continued)

FOREIGN PATENT DOCUMENTS

| DE | 94 05 517 U1 | 8/1994 |
| DE | 195 40 945 A1 | 5/1997 |

(Continued)

OTHER PUBLICATIONS

Infoschrift Nr. 126-d: Die E-Flex-Technologie, Biogest International GmbH, Dec. 7, 2009, pp. 1-6.

(Continued)

*Primary Examiner* — Duane Smith
*Assistant Examiner* — Stephen Hobson
(74) *Attorney, Agent, or Firm* — Manabu Kanesaka

(57) ABSTRACT

The invention relates to a device for aerating a suspension held in a treatment tank, in particular wastewater, activated sludge and the like, with a frame having longitudinal spars (1) and a compressed-air diffuser (3), the housing (G) of which has a multiplicity of first connecting pieces (4) for the connection of air diffuser lines (5) and a second connecting piece (6) for the connection of an air feed line, wherein the housing (G) is fastened to the frame such that first axes of the first connecting pieces (4) run approximately parallel to a plane containing the longitudinal spars (1). To simplify assembly, it is proposed that a second axis of the second connecting piece (6) forms an angle of 30 to 60° with the plane.

19 Claims, 5 Drawing Sheets

(56) References Cited

U.S. PATENT DOCUMENTS

| | | | |
|---|---|---|---|
| 3,080,124 A * | 3/1963 | Rathmann | 239/450 |
| 3,424,443 A * | 1/1969 | Thayer | 261/123 |
| 3,461,675 A * | 8/1969 | Izatt | 405/38 |
| 3,622,132 A * | 11/1971 | Rawlings, Jr. | 261/124 |
| 3,733,064 A * | 5/1973 | Branton | 261/122.1 |
| 3,803,849 A * | 4/1974 | Bryant | 405/22 |
| 3,834,540 A * | 9/1974 | Bernard | 210/195.3 |
| 3,926,810 A * | 12/1975 | Gudernatsch et al. | 210/220 |
| 4,277,341 A * | 7/1981 | Wise et al. | 210/602 |
| 4,279,842 A * | 7/1981 | Belveal | 261/124 |
| 4,474,714 A * | 10/1984 | Downs | 261/124 |
| 4,488,508 A * | 12/1984 | Heideman | 119/215 |
| 4,491,349 A * | 1/1985 | Rice et al. | 285/197 |
| 5,863,472 A * | 1/1999 | Jones | 261/124 |
| 6,190,544 B1 * | 2/2001 | Edwards | 210/96.1 |
| 6,293,525 B1 * | 9/2001 | Ginsburgh et al. | 261/77 |
| 6,702,263 B2 | 3/2004 | Kelly | |
| 6,880,815 B2 * | 4/2005 | Jager | 261/122.1 |
| 7,744,069 B2 | 6/2010 | Hoefken | |
| 8,128,070 B1 * | 3/2012 | Allan et al. | 261/36.1 |
| 2002/0134791 A1 * | 9/2002 | Treat et al. | 222/3 |
| 2006/0151385 A1 * | 7/2006 | Burrows et al. | 210/600 |
| 2008/0135648 A1 * | 6/2008 | Smiltneek et al. | 239/557 |

FOREIGN PATENT DOCUMENTS

| | | | | |
|---|---|---|---|---|
| WO | WO 9722562 A1 * | 6/1997 | | C02F 7/00 |
| WO | WO 2007/051150 A2 | 5/2007 | | |

OTHER PUBLICATIONS

E-FLEX-Beleuftungssystem, Beleuftungstechnik, Invent Umwelt and Verfahrenstechnik, EF 3000 6.03-2 D, Gedruckt Auf Chlorfrei Gebleichtem Papier.

* cited by examiner

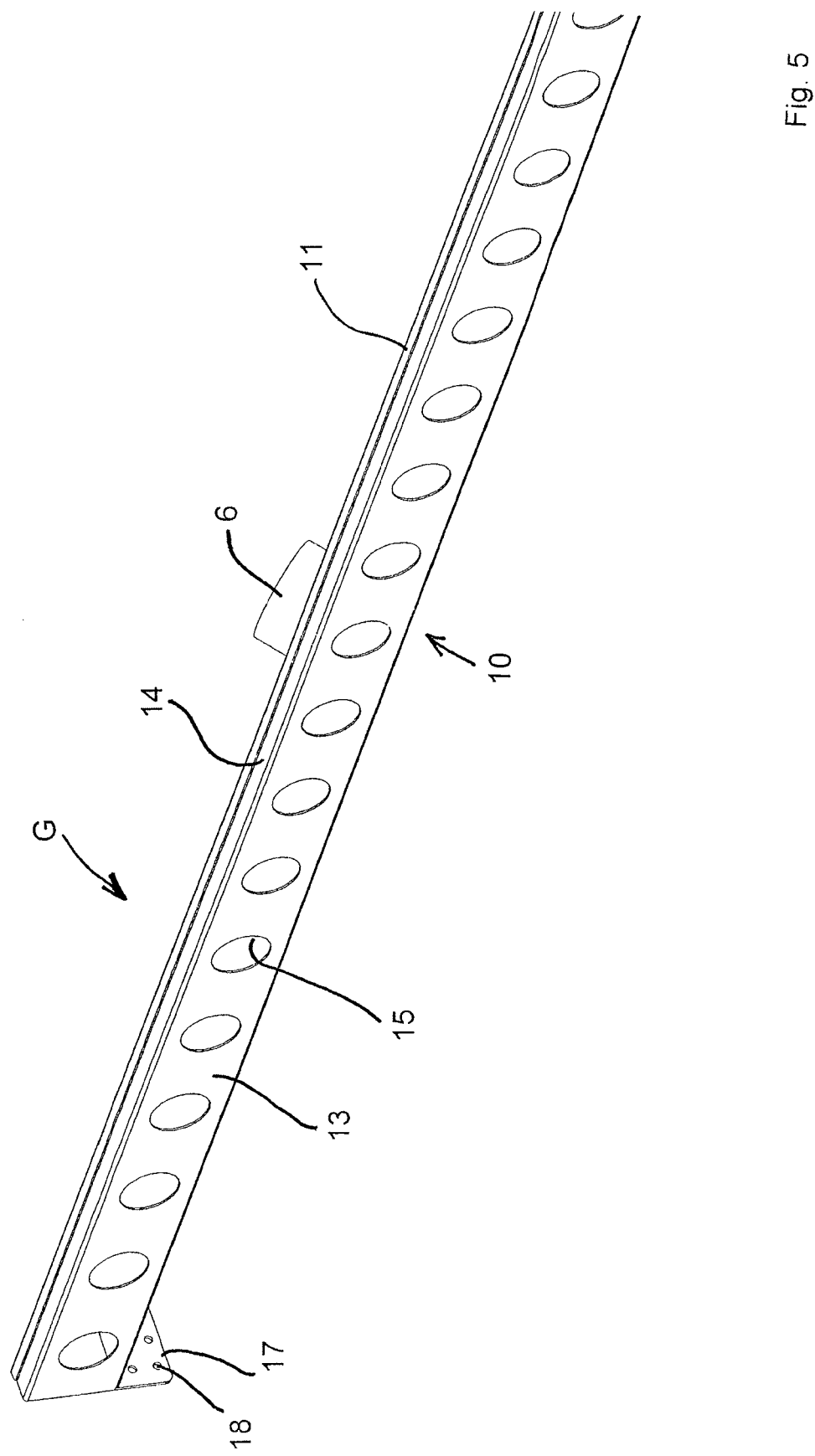

DEVICE FOR AERATING A SUSPENSION HELD IN A TREATMENT TANK

RELATED APPLICATIONS

The present application is National Phase of International Application No. PCT/EP2011/053467 filed Mar. 8, 2011, and claims priority from German Application No. 10 2010 002 959.9, filed Mar. 17, 2010.

The invention relates to a device for aerating a suspension held in a treatment tank, in particular wastewater, activated sludge and the like, according to the preamble of the claim 1.

Such a device is known from the brochure "E-FLEX®-Belüftungs-system", No. EF 3000 6.03-2 D from the company Invent Umwelt-und Verfahrenstechnik GmbH & CO. KG, D-91058 Erlangen.

In the known device, longitudinal spars of a frame are interconnected via a plurality of transverse spars. At one end of the longitudinal spars, a pressurized-air manifold configured in the manner of another transverse spar is attached. The pressurized-air manifold has a housing which is configured in a substantially gas-tight manner and on which a multiplicity of first connecting sockets for connecting air diffuser lines and a second connecting socket for connecting an air feed line are provided. The housing is fastened to the frame such that first axes of the first connecting sockets run approximately parallel to a plane containing the longitudinal spars. This means, the air diffuser lines connected with their first ends to the first connecting sockets run approximately parallel to the longitudinal spars. The air diffuser lines, which are usually formed from perforated tubes, extend up to a holding fixture which is provided opposite to the pressurized-air manifold and is likewise configured in the manner of another transverse spar, and are fastened thereto with their second ends.

If the conventional device is arranged at the edge of the treatment tank, the second axis of the second connecting socket extends substantially perpendicular to the first axes of the first connecting sockets so that an air feed line attached to the second connecting socket can be fed out of the treatment tank approximately perpendicular to a wall of said treatment tank. If the devices are provided centrally in the treatment tank, the air feed line is fed along the tank bottom. In this case, the second connecting socket is attached such that its second axis runs substantially parallel to the first axes of the first connecting sockets. —Thus, in the conventional device, it is required to prepare two different variants of the pressurized-air manifold.

The housing of the conventional manifold is substantially formed from a square pipe, on the one side wall of which, a multiplicity of apertures for installing connecting pieces forming the first connecting sockets is provided. Each connecting piece is fed by means of a special tool from the interior of the housing through an aperture and is subsequently fastened with a screw nut. Overall, producing the conventional pressurized-air manifold is time-consuming and costly.

It is an object of the invention to eliminate the disadvantages according to the prior art. In particular, a device for aerating a suspension held in a treatment tank is to be provided which can be produced in a simple and cost-effective manner. According to another object of the invention, the device shall be usable in the most universal manner possible.

This object is achieved by the features of the claim 1. Expedient embodiments of the invention derive from the features of the claims 2 to 17.

In accordance with the invention it is provided that a second axis of the second connecting socket forms an angle of 30 to 60° with the plane. —As the second axis of the second connecting socket runs obliquely to the plane, it is possible to provide a connection for the air feed line by connecting an angled tube connecting piece to the second connecting socket, which connection is substantially parallel as well as substantially perpendicular to the plane. Thus, with the same device, both variants can be implemented. It is no longer required to produce two different pressurized-air manifolds for this purpose. The proposed device is universal and can be produced in a simple and cost-effective manner.

According to a particularly advantageous embodiment of the invention, the second axis of the second connecting socket forms an angle of approximately 45° with the plane. Thus, through combination with a single angled tube connecting piece, namely a tube connecting piece angled by 45°, both variants of the connection for the air feed line can be implemented.

According to a further advantageous embodiment, the housing is formed from a connecting element and a cover. The connecting element expediently comprises a base plate, a connection wall extending substantially perpendicular from a first long side of the base plate, and two transverse walls extending substantially perpendicular from the short sides of the base plate. The first connecting sockets are advantageously formed from connecting pieces attached to the connection wall. For this purpose, the connection wall can have a connecting piece aperture for connecting each of the connecting pieces. The connecting pieces can be made, for example, of injection-molded plastic. —As the housing has a cover, assembling the connecting pieces can be significantly simplified. It is no longer necessary to provide a special tool for this purpose.

According to a further advantageous embodiment of the invention, fastening sections extending beyond the base plate are provided on the transverse walls. The fastening sections, which preferably have apertures for fastening rivets, can be formed as a one-piece construction with the transverse walls. Furthermore, the transverse walls are advantageously welded to the base plate and the connection plate. Therefore, separate manufacturing and fastening of the fastening sections is no longer required. Thus, manufacturing the device can be further simplified.

According to a further embodiment of the invention, a first support web extends from a second long side of the base plate at an angle of 30 to 60°, preferably 45°. From a third long side of the connection wall, a cover plate can extend which runs substantially parallel to the base plate. From a third long side of the connection wall or from a fourth long side of the cover plate, a second support web can extend at an angle of 30 to 60°, preferably 45°, toward the first support web. Furthermore, third support webs can extend substantially perpendicular from the transverse walls, which third support webs adjoin the first and the second support webs. Providing support webs enables simple and gas-tight fastening of the cover. The cover can be attached to the connecting element, in particular to the support webs, for example, by means of gas-tight rivets and/or can be attached by using a sealant circumferentially provided between the support webs and the cover. In this case, the cover advantageously forms an angle of 30 to 60°, preferably about 45°, with the base plate.

Advantageously, the second connecting socket is attached to the cover. Said second connecting socket has a thread, preferably an internal thread. For implementing the two connection variants for the air feed line, a tube connecting piece angled at an angle of 30 to 60°, preferably 45°, is attached to the second connecting socket. —An angle of the angled tube connecting piece is selected such that together with the angle of the second axis of the second connecting socket, they advantageously complement each other to 90° or 0°. By fastening the tube connecting piece in different orientations to the second connecting socket, it is possible to install the air feed line perpendicular or also parallel to the plane.

An exemplary embodiment of the invention is illustrated in more detail hereinafter by means of the drawings. In the figures:

FIG. 5 shows another perspective view of the pressurized-air manifold.

Figure 1:
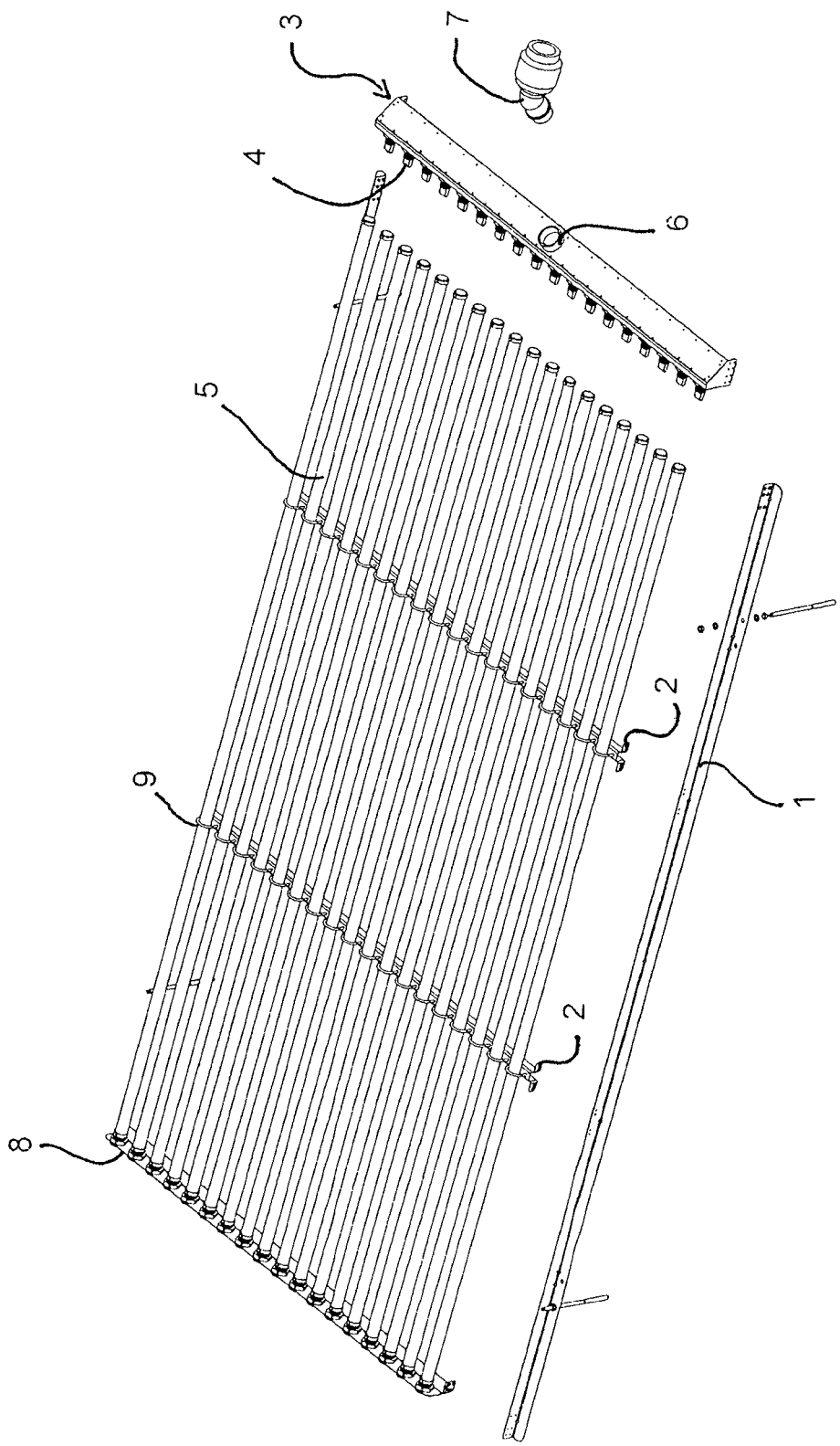
FIG. 1 shows an exploded view of the device.
Figure 2:
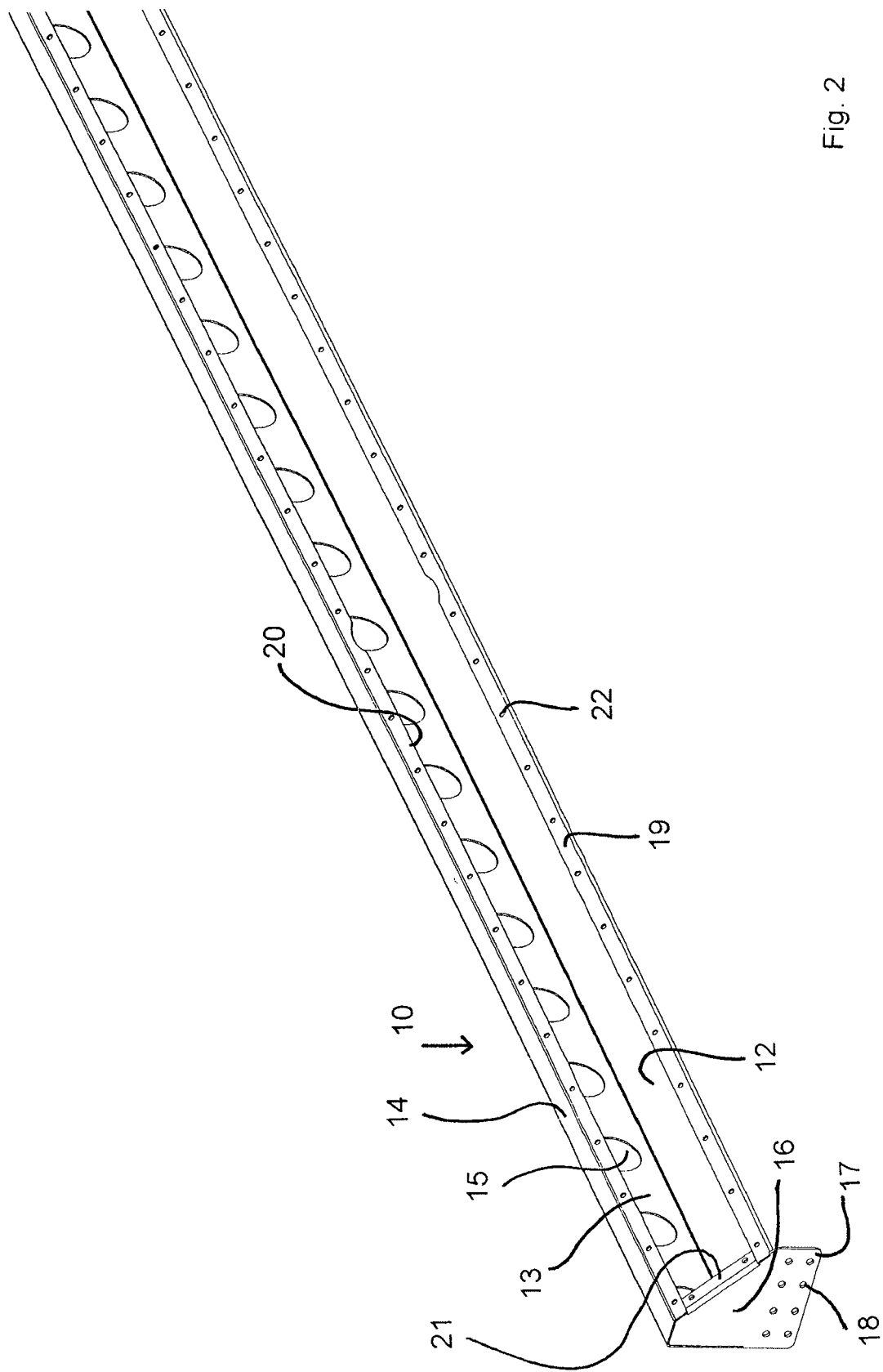
FIG. 2 shows a perspective partial view of a connecting element.
Figure 3:
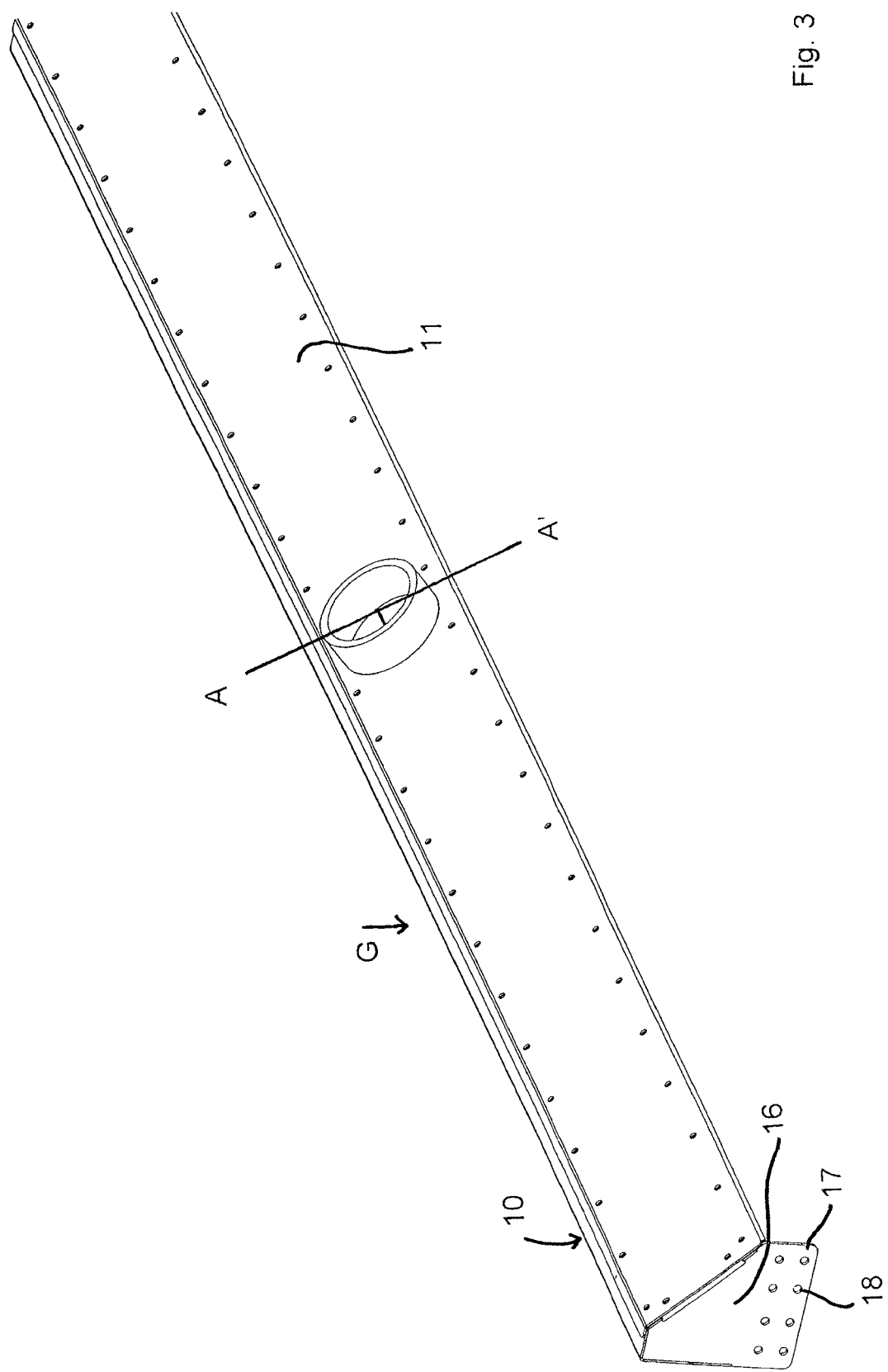
FIG. 3 shows a perspective partial view of the pressurized-air manifold.

In the device shown in FIG. 1, a rectangular frame comprises two longitudinal spars 1 and a plurality of transverse spars 2 connecting the two longitudinal spars 1 to each other. A first transverse side of the frame is formed by a pressurized-air manifold 3. —The longitudinal spars 1 are fastened with one of their ends on both sides of the pressurized-air manifold 3. The pressurized-air manifold 3 has a multiplicity of first connecting sockets 4, at the first ends of which, air diffuser lines 5 are attached. First axes of the first connecting sockets 4 are parallel and run also parallel to a plane that rests on the longitudinal spars 1 or contains the longitudinal spars 1. A second connecting socket is designated with the reference number 6. A second axis of the second connecting socket 6 forms an angle of 45° with the plane. A tube connecting piece 7 angled at an angle of 45° can be connected to the second connecting socket 6. —Second ends of the air diffuser lines 5 are fastened to dummy sockets which are provided on a holding fixture 8. Said holding fixture 8 forms a second transverse side of the frame. The longitudinal spars 1 are fastened with their other ends on both sides of the holding fixture 8.

On the transverse spars 2, which run approximately parallel to the pressurized-air manifold 3 or the holding fixture 8, downholders 9 are attached by means of which the air diffuser lines 5 are held on the transverse spars 2. The air diffuser lines 5 can be made of EPDM rubber, for example. The first connecting sockets 4 and the dummy sockets (not shown in detail here) can be sockets made of fiber-reinforced polypropylene, for example. The air diffuser lines 5 have apertures, for example slots, for discharging air into the surrounding wastewater (not shown here).

FIGS. 2 to 5 show in detail a housing G of the pressurized-air manifold 3. The housing G which is advantageously made of stainless steel sheeting comprises a connecting element 10 and a cover 11 attached thereto. The second connecting socket 6 is attached to the cover 11, preferably by means of a welded joint. The connecting element 10 is formed from a base plate 12 comprising a first and a second long side, a connection plate 13 extending substantially perpendicular from the first long side, and a cover plate 14 running substantially parallel to the base plate 12, said cover plate 14 extending from a third long side of the connection wall 13. The connection wall 13 has a multiplicity of first apertures 15 for connecting the first connecting sockets 4. The reference number 16 designates transverse walls which extend perpendicular to the base plate 12 and are connected to the connection wall 13 and the cover plate 14. Fastening sections 17 with second apertures 18 provided thereon extend in one-piece construction from the transverse walls 16 which are advantageously welded to the base plate 12, the connection wall 13 and the cover plate 14. The reference number 19 designates a first support web which extends from the second long side of the base plate 12 at an angle of 45°. Reference number 20 designates a second support web which extends from a fourth long side of the cover plate 14 at an angle of 45° toward the first support web 19. Reference number 21 designates third support webs which extend from the transverse walls 16 and adjoin the first 19 and second support webs 20. The support webs 19, 20, 21 comprise third apertures 22.

Figure 4:
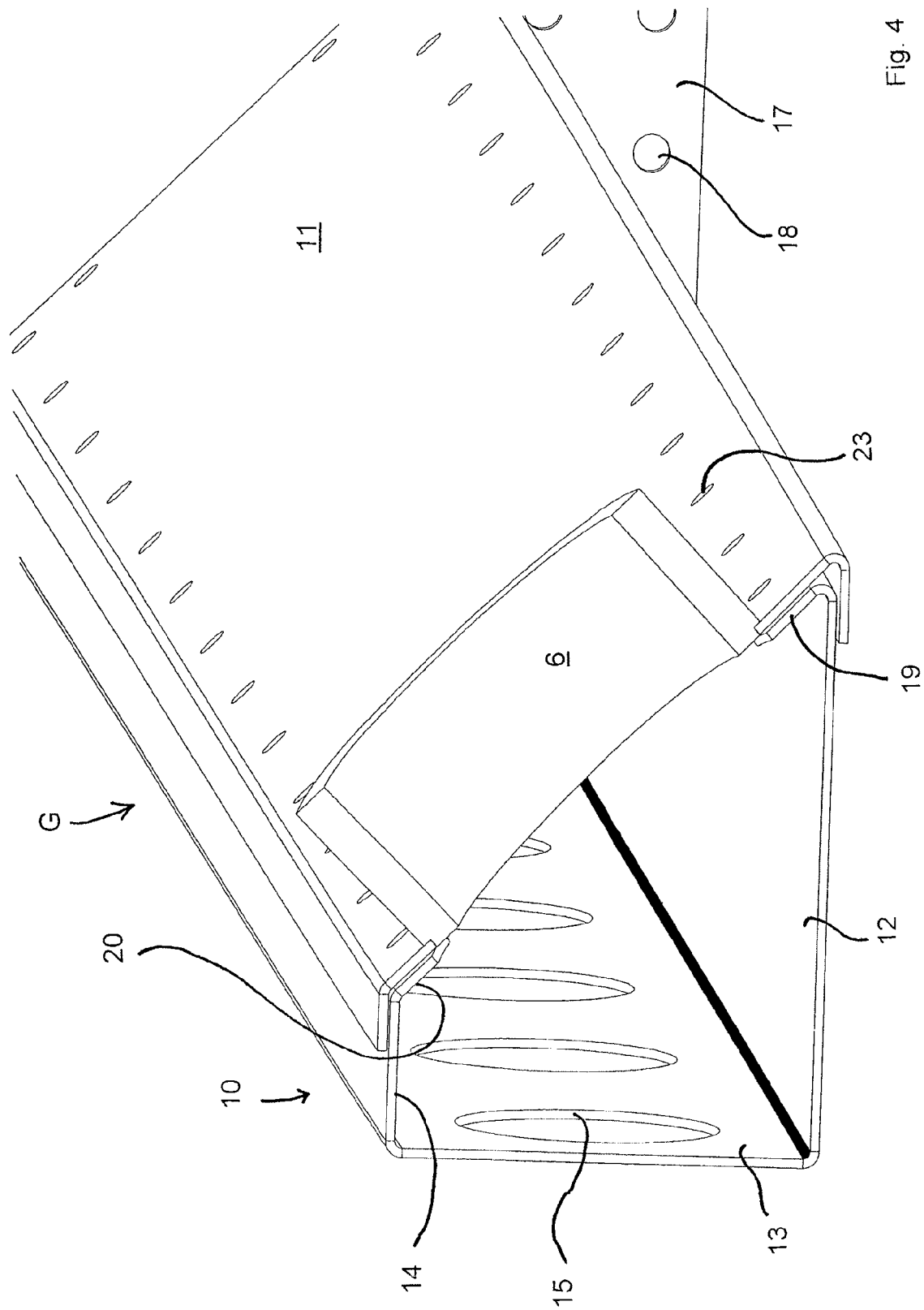
FIG. 4 shows a sectional view according to the section line A-A' in FIG. 3.

As is shown in particular in FIG. 4, the cover 11 has fourth apertures 23 which correspond to the third apertures 22 and which, when the cover 11 rests on the support webs 19, 20, 21, are aligned with the second apertures 18 so that rivets can be inserted through the second 18 and the third apertures 22 and a rivet joint can be created.

The pressurized-air manifold 3 can be assembled in a simple manner as follows:

First, the first connecting sockets 4 are fitted on the connecting element 10. After this, a permanently elastic sealant is applied onto the support webs 19, 20, 21 and subsequently, the cover 11 is attached thereon so that the third 22 and fourth apertures 23 are aligned. Then, the cover 11 is connected to the connecting element 10 by means of gas-tight rivets. The connection established in this manner is gas-tight. By means of the fastening sections 17, the pressurized-air manifold 3 can then be connected to the longitudinal spars 1, for example, again by means of rivet joints. Likewise, the transverse spars 2 and the holding fixture 8 can be connected to the longitudinal spars 1, preferably by means of rivet joints, so that altogether, a rectangular frame is created. Subsequently, the air diffuser lines 5 can be installed within the frame. The 45° tube connecting piece 7 can be fastened in any orientation to the second connecting socket 6 which is preferably made of stainless steel. Accordingly, by means of the 45° tube connecting piece 7 or angle piece, respectively, preferably made of metal or plastic, a third axis for a feed line (not shown here) can be set parallel to the first axes of the first connecting sockets 4 or also perpendicular thereto.

The device shown can be assembled in a simple manner. The device is particularly universal.

REFERENCE LIST 1 longitudinal spar
2 transverse spar
3 pressurized-air manifold
4 first connecting socket
5 air diffuser line
6 second connecting socket
7 45° tube connecting piece
8 holding fixture
9 downholder
10 connecting element
11 cover
12 base plate
13 connection wall
14 cover plate
15 first aperture
16 transverse wall
17 fastening section
18 second aperture
19 first support web
20 second support web
21 third support web 22 third aperture
23 fourth aperture
G housing

The invention claimed is:
1. A device for aerating a suspension held in a treatment tank, in particular wastewater, activated sludge and the like, comprising:
   a frame having longitudinal spars, and
   a pressurized-air manifold, a housing of which has a multiplicity of first connecting sockets for connecting air diffuser lines, and a second connecting socket for connecting an air feed line,
   wherein the housing is fastened to the frame such that first axes of the first connecting sockets run approximately parallel to a plane containing the longitudinal spars,
   a second axis of the second connecting socket forms an angle of 30 to 60° with the plane,
   the housing is formed from a connecting element and a cover,
   the connecting element comprises a base plate and a connection wall extending substantially perpendicular from a first long side of the base plate,
   the first connecting sockets are exclusively provided at the connection wall,
   the cover forms an angle of 30 to 60° with the base plate, and
   the second connecting socket is exclusively attached to the cover.

2. The device according to claim 1, wherein the second axis of the second connecting socket forms an angle of approximately 45° with the plane.

3. The device according to claim 1, wherein the connecting element comprises two transverse walls extending substantially perpendicular from the short sides of the base plate.

4. The device according to claim 1, wherein the first connecting sockets are formed from connecting pieces attached to the connection wall.

5. The device according to claim 3, wherein fastening sections extending beyond the base plate are provided on the transverse walls.

6. The device according to claim 5, wherein the fastening sections are formed as one-piece construction with the transverse walls.

7. The device according to claim 3, wherein the transverse walls are welded to the base plate and the connection wall.

8. The device according to claim 1, wherein a first support web extends from a second long side of the base plate at an angle of 30 to 60°.

9. The device according to claim 1, wherein from a third long side of the connection wall, a cover plate extends which runs substantially parallel to the base plate.

10. The device according to claim 8, wherein from a third long side of the connection wall or from a fourth long side of the cover plate, a second support web extends at an angle of 30 to 60° toward the first support web.

11. The device according to claim 10, wherein the connecting element comprises two transverse walls extending substantially perpendicular from the short sides of the baseplate, and
   third support webs extend substantially perpendicular from the transverse walls, which third support webs adjoin the first and the second support webs.

12. The device according to claim 11, wherein the cover is attached to the connecting element by means of gas-tight rivets and/or is attached by using a sealant circumferentially provided between the first, second, and third support webs and the cover.

13. The device according to claim 1, wherein the cover forms an angle of 30 to 60° with the base plate.

14. The device according to claim 1, wherein the second connecting socket has a thread.

15. The device according to claim 1, wherein a tube connecting piece angled at an angle of 30 to 60° is attached to the second connecting socket.

16. The device according to claim 6, wherein the fastening sections have apertures for fastening rivets.

17. The device according to claim 8, wherein the first support web extends from the second long side of the base plate at an angle of 45°.

18. The device according to claim 10, wherein the second support web extends at an angle of 45° toward the first support web.

19. The device according to claim 15, wherein the tube connecting piece is angled at an angle of 45° to the second connecting socket.

* * * * *